(12) United States Patent
Dhala et al.

(10) Patent No.: US 11,620,628 B2
(45) Date of Patent: Apr. 4, 2023

(54) METHOD AND SYSTEM FOR FRAUD CONTROL BASED ON GEOLOCATION

(71) Applicant: MasterCard International Incorporated, Purchase, NY (US)

(72) Inventors: Amyn Dhala, Jersey City, NJ (US); Kimberly Lewis Peyton, New York, NY (US); Tim Mattingly, Chesterfield, MO (US); Alain Delperdange, Jodoigne-souveraine (BE); Dominique Steenbeek, Wavre (BE); Gregory Coburn, Dublin (IE); Susan Rassbach, Fenton, MO (US); Mark N. Savoye, Hartsdale, NY (US); Benjamin Dessy, Ceroux (BE); Karen Randell, O'Fallon, MO (US); Brad Dickinson, O'Fallon, MO (US); Navjot Sidhu, Ardsley, NY (US); Corey Hively, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 122 days.

(21) Appl. No.: 14/755,262

(22) Filed: Jun. 30, 2015

(65) Prior Publication Data

US 2017/0004486 A1 Jan. 5, 2017

(51) Int. Cl.
*G06Q 20/32* (2012.01)
*G06Q 20/34* (2012.01)
*G06Q 20/40* (2012.01)

(52) U.S. Cl.
CPC ......... *G06Q 20/3224* (2013.01); *G06Q 20/34* (2013.01); *G06Q 20/4016* (2013.01)

(58) Field of Classification Search
CPC .................................................. G06Q 20/3226
See application file for complete search history.

(56) References Cited

U.S. PATENT DOCUMENTS 4,874,932 A 10/1989 Kimizu
5,883,810 A 3/1999 Franklin et al.
(Continued)

FOREIGN PATENT DOCUMENTS

CN 1172257 C 10/2004
CN 104182870 A 12/2014
(Continued)

OTHER PUBLICATIONS

"News: Ericsson IPX Fighting CC Fraud", Extra Credit Cards, May 7, 2009, 1 page, http://www.extracreditcards.com/news/2009may/ericssonipx.htm.
(Continued)

*Primary Examiner* — Joseph W. King
(74) *Attorney, Agent, or Firm* — Panitch Schwarze Belisario & Nadel LLP (57) ABSTRACT

A method for fraud control of a transaction account based on geolocation includes: storing, in an account database, an account profile including data related to a transaction account including a first profile rule associated with a first geographic area and a second profile rule associated with a second geographic area different from the first; receiving an authorization request for a first transaction involving a first payment card, the request including a first geographic location; receiving an authorization request for a second transaction involving a second payment card, the request including a second geographic location; determining validation for each authorization request, wherein each is determined to be valid if the geographic location is in a geographic area corresponding to the first geographic area or the second geographic area; and transmitting the determination of validation for each authorization request to a payment network for processing of the associated payment transaction.

16 Claims, 6 Drawing Sheets

(56) References Cited

U.S. PATENT DOCUMENTS

| | | | |
|---|---|---|---|
| 5,903,830 A | 5/1999 | Joao et al. | |
| 5,963,925 A | 10/1999 | Kolling et al. | |
| 6,913,194 B2 | 7/2005 | Suzuki | |
| 7,487,170 B2 | 2/2009 | Stevens | |
| 7,600,676 B1 | 10/2009 | Rados et al. | |
| 7,664,702 B2 | 2/2010 | Jung et al. | |
| 7,832,636 B2 | 11/2010 | Heffez et al. | |
| 7,909,240 B2 | 3/2011 | Nelson | |
| 8,555,355 B2 | 10/2013 | Rathbun | |
| 2001/0056409 A1 | 12/2001 | Bellovin et al. | |
| 2002/0020741 A1 | 2/2002 | Sakaguchi | |
| 2002/0099649 A1 | 7/2002 | Lee et al. | |
| 2002/0108062 A1 | 8/2002 | Nakajima et al. | |
| 2002/0130176 A1 | 9/2002 | Suzuki | |
| 2002/0160771 A1 | 10/2002 | Massie et al. | |
| 2003/0004879 A1 | 1/2003 | Demoff et al. | |
| 2003/0028481 A1 | 2/2003 | Flitcroft et al. | |
| 2004/0254868 A1 | 12/2004 | Kirkland et al. | |
| 2005/0066179 A1 | 3/2005 | Seidlein | |
| 2006/0237531 A1 | 10/2006 | Heffez et al. | |
| 2008/0227471 A1* | 9/2008 | Dankar | G06Q 20/3224 455/456.6 |
| 2009/0012898 A1 | 1/2009 | Sharma et al. | |
| 2009/0276347 A1 | 11/2009 | Kargman | |
| 2010/0049615 A1 | 2/2010 | Rose et al. | |
| 2010/0272085 A1 | 10/2010 | Baier | |
| 2010/0274691 A1 | 10/2010 | Hammad et al. | |
| 2010/0299262 A1 | 11/2010 | Handler | |
| 2011/0047075 A1 | 2/2011 | Fourez | |
| 2011/0202416 A1 | 8/2011 | Buer et al. | |
| 2012/0150669 A1* | 6/2012 | Langley | G06Q 30/0601 705/16 |
| 2012/0295580 A1 | 11/2012 | Corner | |
| 2012/0310743 A1 | 12/2012 | Johri | |
| 2013/0198076 A1 | 8/2013 | Zambelli Hosmer et al. | |
| 2013/0211900 A1 | 8/2013 | Dessert | |
| 2013/0226803 A1 | 8/2013 | Hsu et al. | |
| 2013/0275303 A1* | 10/2013 | Fiore | G06Q 20/32 705/44 |
| 2015/0012436 A1 | 1/2015 | Poole et al. | |
| 2015/0081349 A1* | 3/2015 | Johndrow | G06Q 20/3224 705/5 |
| 2015/0127536 A1 | 5/2015 | Van Den Broeck et al. | |
| 2017/0004499 A1* | 1/2017 | Dickinson | G06Q 20/405 |

FOREIGN PATENT DOCUMENTS

| | | |
|---|---|---|
| CN | 104182870 B | 12/2017 |
| EP | 0 745 961 A2 | 12/1996 |
| EP | 0 813 173 A2 | 12/1997 |
| EP | 0 848 360 A1 | 6/1998 |
| EP | 1 265 200 A1 | 12/2002 |
| EP | 1 153 375 B1 | 1/2003 |
| EP | 1 286 285 A1 | 2/2003 |
| EP | 2 287 792 A1 | 2/2011 |
| IE | 83058 | 10/2003 |
| JP | 2002352165 A | 12/2002 |
| JP | 200794874 A | 4/2007 |
| JP | 2008-083920 A | 4/2008 |
| JP | 2010-102539 A | 5/2010 |
| JP | 2012185735 A | 9/2012 |
| KR | 2004-0021425 A | 3/2004 |
| KR | 2004-0078954 A | 9/2004 |
| KR | 2005-0121538 A | 12/2005 |
| KR | 2010-0121903 A | 11/2010 |
| KR | 10-1045241 B1 | 6/2011 |
| WO | 00/49586 A1 | 8/2000 |
| WO | 00/63855 A1 | 10/2000 |
| WO | 02/29739 A2 | 4/2002 |
| WO | 02/052879 A1 | 7/2002 |
| WO | 03/063037 A1 | 7/2003 |
| WO | 03/067506 A2 | 8/2003 |

OTHER PUBLICATIONS

Jeremy Kirk, "Ericsson Offers Phone Location Service To Counter Credit Card Fraud", Computerworld Mobile & Wireless, May 26, 2009, 3 pages, http://www.computerworld.com/action/article.do?command=viewArticleBasic&articleId=p.

Jason Kincaid, "Mastercard's ATM Hunter is the Latest Must-Have for Your iPhone Utility Belt", TechCrunch, Apr. 14, 2009, 1 page, htt://www.techcrunch.com/2009/04/14/mastercards-atm-hunder-is-the-must-have-for-your-iphone-utilitybelt.

"Mastercard Corporate Fleet Card", Mastercard Worldwide, 2 pages, http:www.mastercard.com/us/business/en/corporate/fleet/payments/fleet_card.html.

New Mobile Phone Technology From Secure Identity Systems Stops Card Fraud Cold, Money & Finance, Business Wire, Posted Mar. 5, 2008, 2 pages, http://www.secureidentitysystems.com/news/articles/08_3march/03_07_08_AOLMoneyandFinance.pdf, AOL.

Confirm Fraud Management Solutions, Fraud Management Solutions for Credit Card Issuers, 1 page, http://www.mconfirm.com/index.html.

IEEE 100 The Authoritative Dictionary of IEEE Standards Terms Seventh Edition, IEEE publish by Standards Information Network IEEE Press. (2 pages).

http://web.archive.org/web/20080416121241/http://www.webopedia.com/TERM/C/compile.html, (Apr. 16, 2008), 3 pages).

The extended European Search Report dated Nov. 4, 2010, by the European Patent Office in European Patent Application No. 10173343.4-1238. (6 pages).

International Search Report (Form PCT/ISA/210) and the Written Opinion of the International Searching Authority (Form PCT/ISA/237) dated Apr. 12, 2011, by the Korean Intellectual Property Office in the International Application No. PCT/US2010/002277. (7 pages).

Notification of Transmittal of the International Search Report (Forms PCT/ISA/220 and PCT/ISA/210) and the Written Opinion of the International Searching Authority (Form PCT/ISA/237) dated Jun. 4, 2013, by the Korean Intellectual Property Office in the International Application No. PCT/US2013/027892. (10 pages).

Notification of Transmittal of the International Search Report (Forms PCT/ISA/220 and PCT/ISA/210) and the Written Opinion of the International Searching Authority (Form PCT/ISA/237) dated Jul. 23, 2013, by the Korean Intellectual Property Office in the International Application No. PCT/US2013/033407. (11 pages).

Office Action (Communication pursuant to Article 94(3) EPC) dated Dec. 4, 2014, by the European Patent Office in European Patent Application No. 10 173 343.4-1955. (5 pages).

The extended European Search Report dated Aug. 26, 2015, by the European Patent Office in European Patent Application No. 13775612.8-1958. (6 pages).

International Search Report and Written Opinion issued by the International Search Authority dated Aug. 30, 2016 in corresponding PCT Application No. PCT/US2016/034033 (9 pages).

Examination Report No. 1 for standard patent application dated Oct. 5, 2018, by the Australian Patent Office in corresponding Australian Patent Application No. 201628530. (3 pages).

Extended European Search Report dated Jan. 29, 2019, by the European Patent Office in corresponding European Patent Application No. 16818405.9-1217. (9 pages).

Office Action (Decision of Rejection) dated Nov. 25, 2021, by the China National Intellectual Property Administration in corresponding Chinese Patent Application No. 201680037195.4 and an English Translation of the Office Action. (13 pages).

Office Action (Second Office Action) dated Aug. 4, 2021, by the China National Intellectual Property Administration in corresponding Chinese Patent Application No. 201680037195.4 and an English Translation of the Office Action. (21 pages).

Office Action (First Office Action) dated Aug. 10, 2020, by the China National Intellectual Property Administration in corresponding Chinese Patent Application No. 201680037195.4 and an English Translation of the Office Action. 21 pages).

(56) References Cited

OTHER PUBLICATIONS

Office Action (First Examination Report) dated Aug. 15, 2020, by the Intellectual Property India in corresponding India Patent Application No. 201717043318 with an English Translation of the office Action. (7 pages).

* cited by examiner

METHOD AND SYSTEM FOR FRAUD CONTROL BASED ON GEOLOCATION

FIELD

The present disclosure relates to fraud control of payment transactions based on geolocation, specifically the use of multiple profile rules in a transaction account profile for a transaction account with multiple payment cards to ensure the successful processing of transactions using each payment card while preventing attempted fraudulent use of the payment cards.

BACKGROUND

As the use of payment cards and other payment instruments associated with transaction accounts increases, the amount of fraud that is attempted, often successfully, also increases. In addition, as new methods for fraud detection and prevention are developed, fraudsters often try to develop new methods of their own, to continue perpetrating fraud. As a result, financial institutions, payment networks, merchants, and consumers are all often trying to continuously develop new methods to prevent fraud on transaction accounts.

Fraud can be due to a payment card number being compromised, wherein the details of the card account become known to a fraudster who then uses it. When this use is in a geographic location where the cardholder is unlikely to be, a fraud alert can be used to prevent a transaction from being authorized. However, when two or more people (e.g., family members) are authorized users of the same transaction account (i.e., each have their own payment card, often bearing the same transaction account number associated with one transaction account), false denies of authorization requests can occur if one cardholder is traveling, particularly abroad to locations known for having statistically higher percentages of this type of compromised number fraud, when the same account number is used in the home and foreign points of sale. Being aware of this, cardholders sometimes contact the card account issuing bank to advise them of impending travel, with is not inefficient, often ineffective and requires both increase human and computer processing time for the multiple format communications (e.g., voice, e-mail, etc.) that often have to be entered into another system including a payment system.

One other way for preventing fraudulent transactions for a transaction account includes the use of a mobile communication device associated with an account holder. In such methods, the geographic location of the account holder's mobile communication device is identified during the authorization process of a payment transaction or at a regular interval such that the geographic location has been recently identified at the time of the authorization of the transaction. The geographic location of the account holder's device is then compared to the geographic location of the transaction. If the geographic locations are different, the transaction may be denied in order to prevent fraud.

While such methods can be effective in preventing fraud, they also often limit the account holder's own use of their account. For example, if the account holder leaves their mobile device at home, if their mobile device is powered off, or if their mobile device does not have service, then its location cannot be identified, and attempted transactions may thereby be denied. In another example, if there are multiple payment cards issued that are tied to a transaction account, either the geographic location of a single device may be used, thus limiting the use of the additional payment cards, or the geographic location of multiple mobile devices may be used during authorization, which requires additional data transmissions and may thus further increase processing time in addition to suffering from the general negatives of using mobile device locations at authorization as discussed above.

Thus, there is a need for a technical solution to improve the prevention of fraud for payment transactions based on geolocation that is efficient, reducing complexity in communications between different communication formats and systems and avoids unnecessarily denying valid transactions (and the subsequent communications regarding same), particularly in instances where multiple payment cards may be associated with a transaction account.

SUMMARY

The present disclosure provides a description of systems and methods for fraud control of a transaction account based on geolocation.

A method for fraud control of a transaction account based on geolocation includes: storing, in an account database, an account profile, wherein the account profile includes data related to a transaction account associated with at least two payment cards including at least a first profile rule associated with a first geographic area and a second profile rule associated with a second geographic area different from the first geographic area; receiving, by a receiving device, an authorization request for a first payment transaction involving a first payment card associated with the related transaction account, wherein the authorization request includes at least a first geographic location; receiving, by the receiving device, an authorization request for a second payment transaction involving a second payment card associated with the related transaction account, wherein the authorization request includes at least a second geographic location; determining, by a processing device, validation for each received authorization request, wherein each authorization request is determined to be valid if the included geographic location is included in a geographic area corresponding to the first geographic area or the second geographic area; and transmitting, by a transmitting device, at least the determination of validation for each received authorization request to a payment network for processing of the associated payment transaction.

A system for fraud control of a transaction account based on geolocation includes an account database, a receiving device, a processing device, and a transmitting device. The account database is configured to store an account profile, wherein the account profile includes data related to a transaction account associated with at least two payment cards including at least a first profile rule associated with a first geographic area and a second profile rule associated with a second geographic area different from the first geographic area. The receiving device is configured to receive: an authorization request for a first payment transaction involving a first payment card associated with the related transaction account, wherein the authorization request includes at least a first geographic location; and an authorization request for a second payment transaction involving a second payment card associated with the related transaction account, wherein the authorization request includes at least a second geographic location. The processing device is configured to determine validation for each received authorization request, wherein each authorization request is determined to be valid if the included geographic location is included in a geographic area corresponding to the first geographic area or the second geographic area. The transmitting device is configured to transmit at least the determination of validation for each received authorization request to a payment network for processing of the associated payment transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

System for Fraud Control of a Transaction Account Based on Geolocation

Figure 1A:
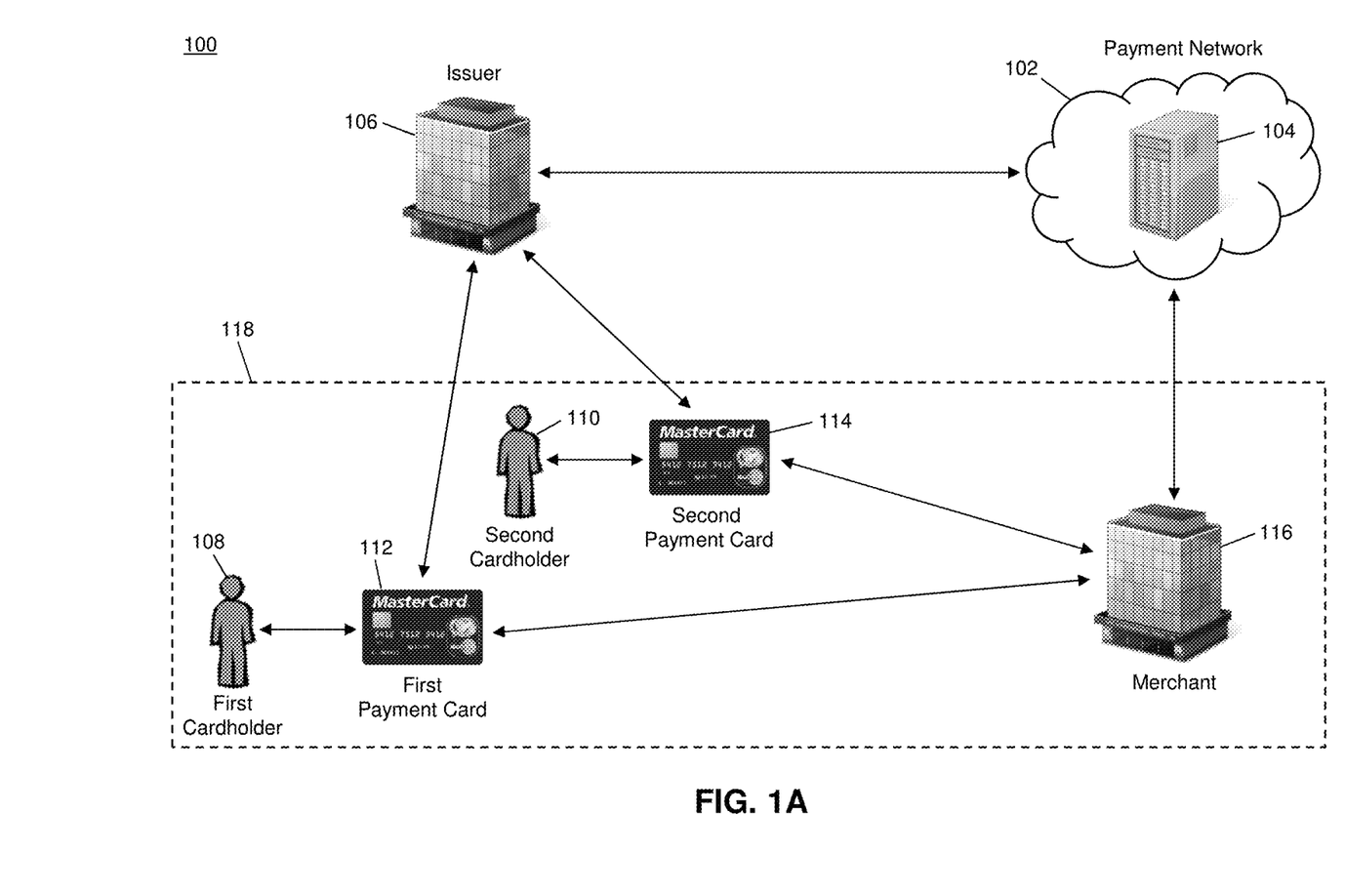
FIGS. 1A and 1B are block diagrams illustrating a high level system architecture for the fraud control of a transaction account having multiple payment cards based on geolocation using profile rules in accordance with exemplary embodiments.
Figure 1B:
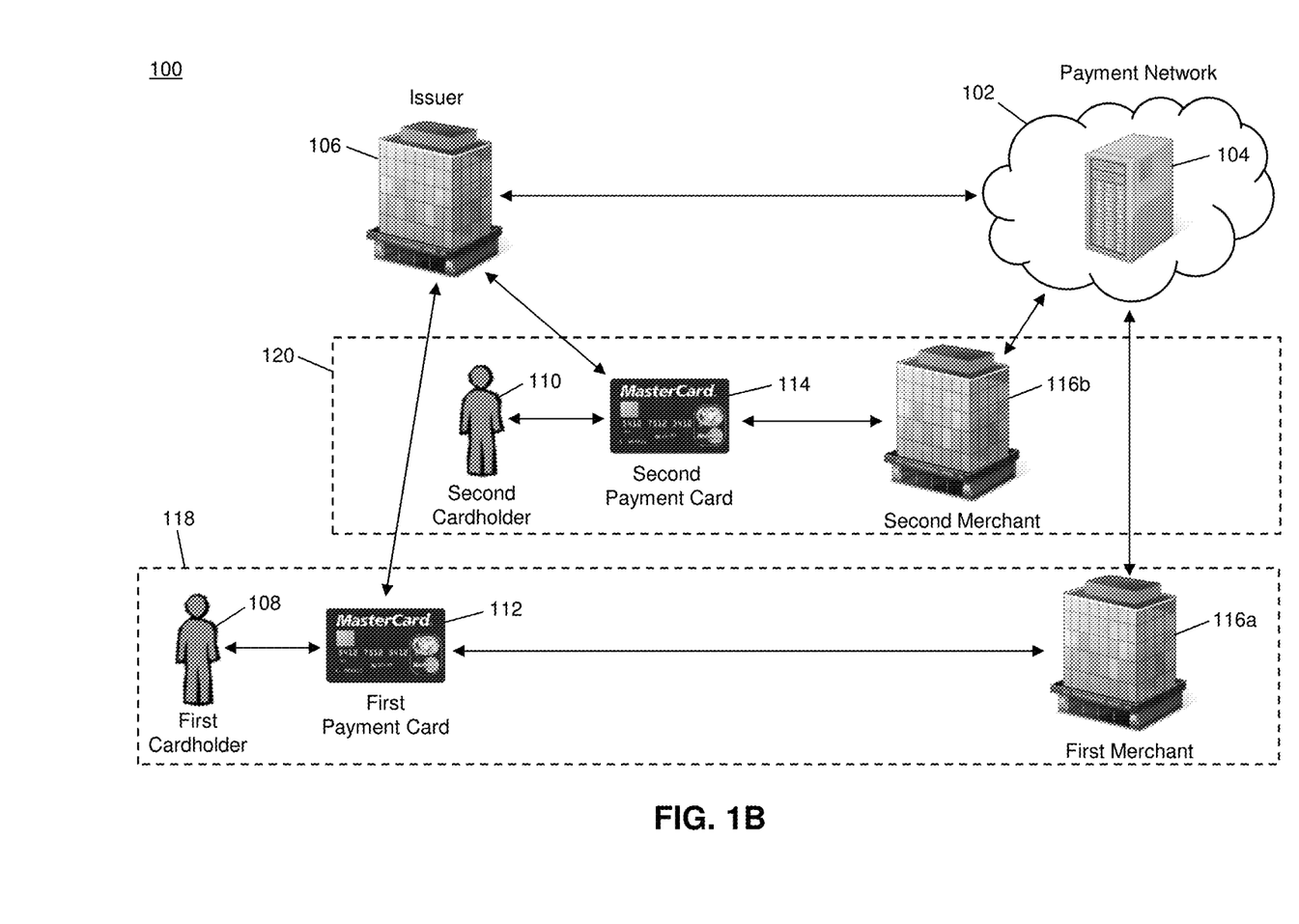

FIGS. 1A and 1B illustrate a system 100 for the fraud control of a transaction account having multiple payment cards based on geolocation using profile rules associated with a transaction account profile.

The system 100 may include a payment network 102. The payment network 102 may be configured to process payment transactions for transaction accounts using traditional methods and systems that will be apparent to persons having skill in the relevant art. The payment network 102 may include a processing server 104. The processing server 104, discussed in more detail below, may be configured to use profile rules to prevent fraudulent transactions for transaction accounts having multiple payment cards processed by the payment network 102.

The payment network 102, and, in some instances, the processing server 104 of the payment network 102, may communicate with an issuer 106. The issuer 106 may be a financial institution configured to issue transaction accounts. In the system 100, the issuer 106 may issue a single transaction account to which a first cardholder 108 and a second cardholder 110 both have access. For instance, the first cardholder 108 and second cardholder 110 may be a married couple, a parent and child, an employer and employee, or other pair of cardholders both associated with the same transaction account.

The issuer 106 may issue a first payment card 112 and a second payment card 114 to the first cardholder 108 and the second cardholder 110, respectively, that are associated with the payment account. The payment cards 112 and 114 may be used by the respective cardholders 108 and 110 to conduct payment transactions at a merchant 116. In a traditional payment transaction, the cardholder 108 or 110 may present their payment card 112 or 114 to the merchant 116 for payment, the merchant 116 may read payment details from the payment card, and may transmit the payment details to the payment network 102 (e.g., via an acquiring financial institution, such as an acquiring bank, not shown) for processing.

In the system 100, the processing server 104 may use profile rules that use geolocation in order to prevent fraudulent usage of the first or second payment cards 112 or 114 or of the associated transaction account. As discussed in more detail below, the processing server 104 may store an account profile related to the transaction account associated with the first and second cardholders 108 and 110. The account profile may include a plurality of profile rules. For one or more of the profile rules, each profile rule may be associated with a geographic area. For instance, the profile associated with the first and second cardholders 108 and 110 may include a first profile rule associated with a first geographic area 118 (e.g., home country), illustrated in FIG. 1A.

When the first or second cardholder 108 or 110 use their respective payment card 112 or 114 to conduct a payment transaction with the merchant 116 in the first geographic area 118, transaction details for the payment transaction, including a geographic location of the merchant 116, may be transmitted to the processing server 104 in the payment network 102 as part of the transaction. The processing server 104 may identify the geographic location of the merchant 116 included in the transaction details as being located in the first geographic area 118, which is associated with a profile rule in the transaction account. Because the profile rule is associated with the first geographic area 118 that includes the merchant 116, the transaction may be validated. In some embodiments, the transaction may be validated only with respect to the geolocation of the respective cardholder and the merchant 116, and additional validations (e.g., fraud controls, risk assessments, etc.) may be performed.

In an exemplary embodiment, each transaction account profile may be associated with two or more geographic location-based profile rules. As illustrated in FIG. 1B, the transaction account associated with the first cardholder 108 and the second cardholder 110 may be associated with two profile rules: a first profile rule associated with the first geographic area 118 and a second profile rule associated with the second geographic area 120. Logic associated with the two or more profile rules would not alert to possible fraud or block authorization of the transaction if either of the two or more geography location profile rules is satisfied, for example, though the analysis can be more detailed and of course, other profile rules might apply. When either cardholder 108 or 110 uses one of their transaction account's associated payment cards 112 or 114 to conduct a payment transaction, the processing server 104 may validate the transaction if the transacting merchant is located in a geographic area associated with one of the account's associated profile rules.

For example, if the first cardholder 108 uses the first payment card 112 at a first merchant 116a included in the first geographic area 118, the processing server 104 may validate the transaction. Similarly, if the second cardholder 110 uses the second payment card 114 at a second merchant 116b included in the second geographic area 120, the processing server 104 may also validate the transaction. If a transaction is attempted using either payment card 112 or 114 with a merchant 116 that is not located in either the first geographic area 118 or the second geographic area 120, the processing server 104 may determine that the transaction is invalid due to the merchant's location being outside of the geographic areas 118 and 120 associated with the profile rules for the transaction account.

By using multiple profile rules for transaction accounts for which there are multiple payment cards issued, the processing server 104 may be able to validate transactions for cardholders even if the payment cards are used in two different geographic areas. This is an improvement over traditional systems, where if one cardholder travels outside of home location, such as when traveling to a foreign country, their payment card may no longer be used due to traditional fraud controls. If the cardholder contacts their financial institution (e.g., issuer 106) or payment network 102 to inform them of their traveling to the foreign country, transactions from that country may be allowed, but at the expense of transactions in the home country. Thus, a second cardholder for the account may be prohibited from using their payment card. Accordingly, the use of two separate profile rules as discussed herein may enable two separate cardholders using separate payment cards associated with a payment account to transact successfully, providing for an improved user experience, which may provide for increased card usage, thereby increasing revenue and consumer relationships for issuers 106, merchants 116, and payment networks 102.

In some embodiments, the processing server 104 may be further configured to update profile rules associated with a transaction account. For example, if the second cardholder 110 travels outside of the second geographic area 120 to a third geographic area, the processing server 104 may be configured to update the profile rule that was associated with the second geographic area 120 to be associated with the third geographic area. Therefore, when the second cardholder 110 attempts a transaction with a merchant 116 in the third geographic area, the processing server 104 may validate the transaction, but if a fraudster attempts a transaction in the second geographic area 120, the transaction may be determined to be invalid by the processing server 104.

By changing the geographic area associated with the profile rule, the processing server 104 may be able to validate transactions for the cardholders 108 and 110 regardless of where each individual cardholder may be located, while still protecting the transaction account from fraudulent transactions conducted outside of the appropriate geographic areas. As a result, each of the cardholders 108 and 110 may be free to travel or stay in their home geographic area, without worrying about their ability to transact. In addition, in embodiments where the processing server 104 may update the profile rules automatically, or without participation by the cardholders 108 and 110, the cardholders may be able to freely move and transact without performing any additional actions to enable use of their payment cards 112 and 114 in the new areas.

In such embodiments, the processing server 104 and/or payment network 102 may identify when one of the cardholders 108 or 110 associated with a transaction account travel to a new geographic area outside of the geographic areas 118 and 120 associated with their profile rules. For instance, when a cardholder 108 or 110 enters a new geographic area, an indication of such may be transmitted to the processing server 104. In one example, a cardholder may be associated with a mobile communication device. A mobile network operator or other third party entity may identify that the mobile communication device is located in a new geographic area and may notify the processing server 104 accordingly. In another example, a cardholder may be associated with an identity document, such as a passport or an identification card. A governmental entity or other regularly agency, like a customs agency, may identify the presentation of the identity document in a new geographic area (e.g., when a cardholder travels to a new country and presents their passport), and may notify the processing server 104. Additional methods for identification of the movement of a cardholder to a new geographic area will be apparent to persons having skill in the relevant art, including those disclosed in U.S. Published Patent Application No. 20110047075 in the name of Pablo Fourez, herein incorporated by reference.

In some instances, the location of the cardholder 108 or 110 may be identified only if moving into a new geographic area, such as from a prior geographic area associated with a profile rule associated with the transaction account, such as the geographic areas 118 and 120. In such instances, the geographic areas may be defined by the third party entity identifying the location (e.g., customs agency, mobile network operator, etc.), the payment network 102 and/or processing server 104, the issuer 106, cardholders 108 and/or 110, or any other suitable entity. For instance, the geographic areas may be municipality demarcations or groups thereof, may be set by a cardholder based on travel habits, may be set by the payment network 102 or processing server 104 based on user transaction history, etc. For example, the processing server 104 may identify a profile rule associated with a home geographic area (e.g., the first geographic area 118) based on the geographic locations of transactions involving the cardholders 108 and 110.

By updating the transaction account's profile rules upon entry of a cardholder in a new geographic area, the processing server 104 may be able to provide greater protection against fraud without the negative effects of traditional methods. For instance, the cardholder may transact freely in the new geographic area without keeping their mobile device present, or without having a mobile device entirely, yet still receive the benefits provided by the processing server 104 as discussed herein. Accordingly, the methods and systems discussed herein may provide for more effective protection against fraud that is less restrictive to cardholders, more flexible for both cardholders and issuers, and can operate faster and with greater efficiency than traditional systems, and with greater consumer privacy, due to a reduced frequency of checks on cardholder locations.

Processing Server

Figure 2:
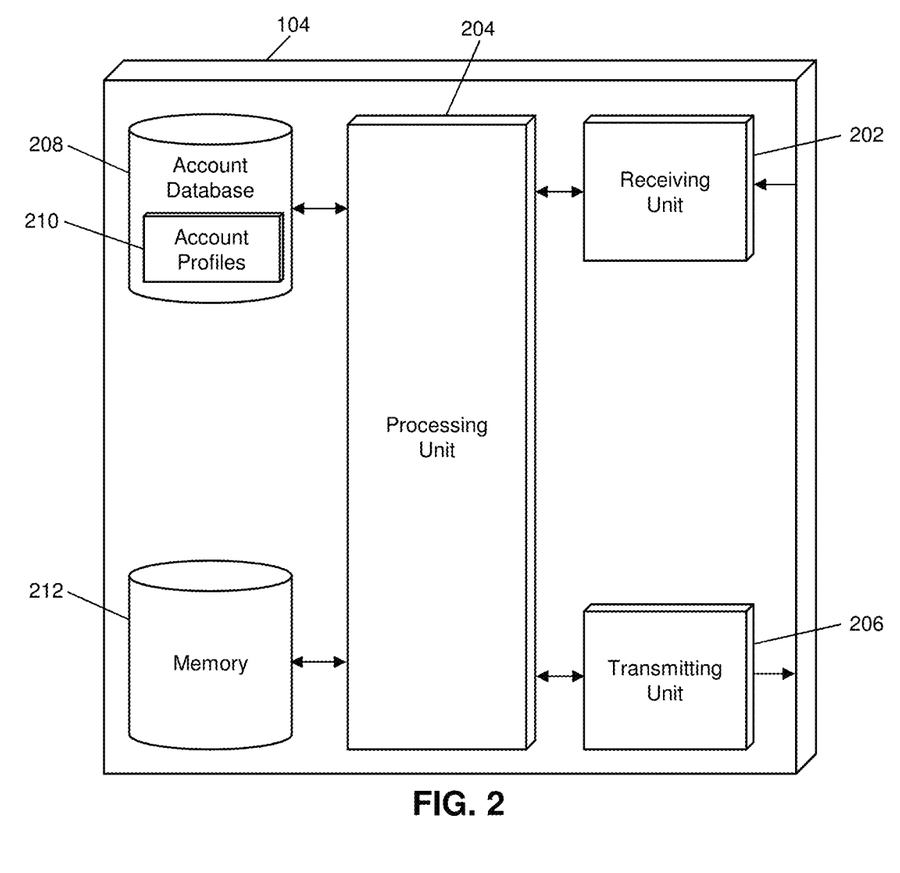
FIG. 2 is a block diagram illustrating the processing server of FIG. 1 for fraud control of a transaction account based on geolocation using profile rules in accordance with exemplary embodiments.

FIG. 2 illustrates an embodiment of the processing server 104 of the system 100. It will be apparent to persons having skill in the relevant art that the embodiment of the processing server 104 illustrated in FIG. 2 is provided as illustration only and may not be exhaustive to all possible configurations of the processing server 104 suitable for performing the functions as discussed herein. For example, the computer system 500 illustrated in FIG. 5 and discussed in more detail below may be a suitable configuration of the processing server 104.

The processing server 104 may include a receiving unit 202. The receiving unit 202 may be configured to receive data over one or more networks via one or more network protocols. The receiving unit 202 may be configured to receive account information associated with transaction accounts, such as from issuers 106, cardholders 108 or 110, merchants 116, etc. The account information may include transaction account numbers, which may include payment card numbers associated with first and second payment cards 112 and 114, transaction data, mobile device data, identity document data, location data, etc.

Received account information may be stored in an account database 208 of the processing server 104. The account database 208 may be configured to store a plurality of account profiles 210. Each account profile 210 may be configured to store data related to a transaction account that is associated with at least two payment cards 112 and 114, and may include account identifiers associated with each payment card. Account identifiers may include any value suitable for identification of the associated payment card, such as a payment card number, personal account number, etc. Each account profile 210 may include at least a two profile rules, including a first profile rule associated with a first geographic area 118 and a second profile rule associated with a second geographic area 120.

The receiving unit 202 may be further configured to receive authorization requests for payment transactions. Authorization requests may be transaction messages that are formatted based on one or more associated standards regarding the interchange and use of transaction messages, such as the International Organization for Standardization's ISO 8583 standard. Transaction messages may be received by the receiving unit 202 using specialized protocols for the communication thereof, and/or received via the payment network 102 configured to receive transaction messages using traditional payment rails.

Authorization requests received by the receiving unit 202 may include data related to a payment transaction stored in a plurality of data elements in the transaction message. The data elements may include a data element configured to store a personal account number, which may be associated with a payment card or other payment instrument used to fund the corresponding payment transaction, and may also include a data element configured to store a geographic location for the corresponding payment transaction. The geographic location may be stored as a country code, zip code or postal code, street address, merchant identifier (e.g., associated with a geographic location or area), or other suitable value.

The processing server 104 may include a processing unit 204. The processing unit 204 may be configured to perform the functions of the processing server 104 as discussed herein as will be apparent to persons having skill in the relevant art. The processing unit 204 may be configured to identify an account profile 210 related to a transaction account involved in a payment transaction corresponding to a received authorization request. The account profile 210 may be identified via inclusion of an account identifier corresponding to the personal account number stored in the corresponding data element in the received authorization request.

The processing unit 204 may be further configured to validate payment transactions based on geolocation. The validation may be performed by identifying if the geographic location of the transaction, identified using the data included in the corresponding data element in the authorization request, is located in a geographic area associated with one of the profile rules stored in the identified account profile 210. If the geographic location is included in one of the geographic areas, then the processing server 104 may consider the geolocation to be validated. If the geographic location is outside of each of the geographic areas, then the geolocation for the payment transaction may be invalid.

The processing server 104 may further include a transmitting unit 206. The transmitting unit 206 may be configured to transmit data over one or more networks via one or more network protocols. The transmitting unit 206 may be configured to transmit, for example, the validation determination made by the processing unit 204, such as to an issuer 106. For instance, the transmitting unit 206 may forward the received authorization request and the corresponding validation determination to an issuer 106 associated with the transaction account involved in the payment transaction. The issuer 106 may then approve or deny the payment transaction using traditional methods, taking into account the processing server's determination as to the validity of the geolocation of the transaction.

In some embodiments, the processing unit 204 may be configured to modify transaction messages. For instance, once the validation determination has been made, the processing unit 204 may modify an authorization request to include the validation determination, such as by storing the determination into a data element or modifying an existing data element included in the authorization request. In such embodiments, the validation determination may be transmitted to the issuer 106 as included in the modified authorization request, transmitted by the transmitting unit 206.

In some embodiments, an account profile 210 may include more than two profile rules. In some instances, the account profile 210 may include at least one profile rule associated with each payment card associated with the related transaction account. In some cases, an account profile 210 may include more profile rules than associated payment cards. For example, an account profile 210 may include a profile rule associated with each payment card, and an additional profile rule associated with a geographic area that includes a home location associated with the cardholders. In some instances, profile rules may be included in an account profile 210 for association with a geographic area in which a cardholder has a recurring transaction. For example, a profile rule may correspond to a geographic area that includes a cardholder's place of residence, with the account profile 210 having additional profile rules associated with each payment card, such that if the cardholder(s) travel to a new geographic area, each payment card may still be used, while recurring or automatic transactions (e.g., for bills, subscriptions, etc.) may still be conducted in the home geographic area. It will be apparent to persons having skill in the relevant art that each account profile 210 may include a different number and configuration of profile rules, which may be based on the number of payment cards, number of cardholders, number of residences, travel or spending habits, or other considerations that may be individual to each respective account profile 210.

The processing server 104 may also include a memory 212. The memory 212 may be configured to store data for the processing server 104 suitable for use in performing the functions discussed herein. For example, the memory 212 may be configured to store geographic area information, geographic location information, merchant geographic location associations, country code data, etc. Additional data that may be stored in the memory 212 will be apparent to persons having skill in the relevant art.

The receiving unit 202 may be further configured to receive updated geographic location information. Updated geographic location information may include an account identifier or other identifier associated with an account profile 210 including an updated geographic location or geographic area. The processing unit 204 may be configured to identify the indicated account profile 210 and update one or more profile rules stored in the account profile 210 based on the updated geographic location or geographic area. The other identifier that may be used to identify an account profile 210 may be associated with the method used to identify the updated geographic location, such as a device identifier (e.g., media access control address, registration number, serial number, phone number, e-mail address, etc.) associated with a mobile device, document identifier (e.g., identification number, tax identification number, etc.) associated with an identity document, etc.

The processing unit 204 may update a profile rule based on the received updated geographic location data. For example, if the received data includes a previous geographic location or area, the processing unit 204 may identify a corresponding profile rule and update the profile rule to be associated with the new area. In another example, if the received data is associated with a particular payment card (e.g., the first payment card 112 or the second payment card 114), the processing unit 204 may update the geographic area associated with a profile rule associated with that particular payment card.

In some embodiments, an account profile 210 may be further configured to store transaction data. The transaction data may be associated with a plurality of payment transactions conducted involving the related transaction account. For example, when the payment network 102 processes a payment transaction involving the related transaction account, data for the payment transaction (e.g., as included in the received authorization request) may be stored in the account profile 210. In such embodiments, the processing unit 204 may be configured to identify a geographic area associated with the related transaction account, such as a geographic area indicative of the related cardholder's residence, place of business, frequent destination, etc. using methods and systems that will be apparent to persons having skill in the relevant art. In such embodiments, the processing unit 204 may generate a profile rule for the account profile 210 associated with the identified geographic area automatically, which may be included in the account profile 210 (e.g., upon confirmation from an associated cardholder 108 or 110 and/or issuer 106).

In some embodiments, the components of the processing server 104 discussed herein may be configured to perform additional functions, and/or the processing server 104 may include additional components configured to perform additional functions that will be apparent to persons having skill in the relevant art. For example, in some instances the processing server 104 may be configured to perform traditional functions of the payment network 102. In such an instance, the processing server 104 may include additional components, or the components illustrated in FIG. 2 and discussed herein may be configured to perform additional functions associated with the traditional processing of payment transactions in the payment network 102, such as the application of fraud algorithms, risk assessment of transactions, verification of payment cryptograms, application of offers, discounting of transactions, etc.

Process for Fraud Control Based on Geolocation

Figure 3:
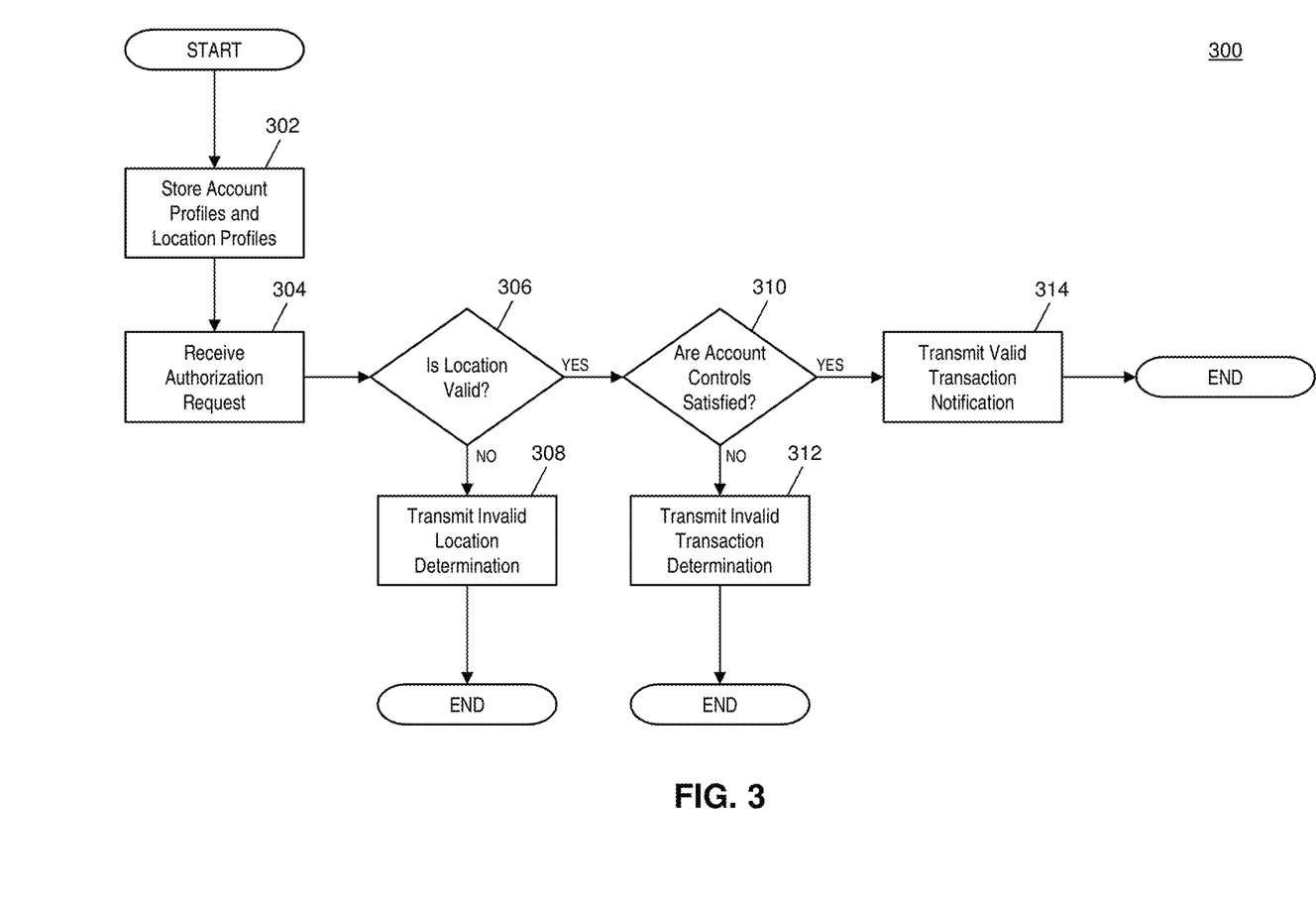
FIG. 3 is a flow diagram illustrating a process for validating a payment transaction based on profile rules using the processing server of FIG. 2 in accordance with exemplary embodiments.

FIG. 3 illustrates a process 300 for the validation of payment transactions for fraud control based on geolocation using profile rules, as performed by the processing server 104 of the system 100 and illustrated in FIG. 2 and discussed above.

In step 302, account profile 210 may be stored in the account database 208 of the processing server 104. Each account profile 210 may be related to a transaction account and associated with two or more payment cards and may include two or more profile rules. Each profile rule may be associated with a different geographic area, such as the first geographic area 118 and the second geographic area 120. For example, the geographic areas may be geographic regions, such as North America and the European Union.

In step 304, the receiving unit 202 of the processing server 104 may receive an authorization request for a payment transaction. The authorization request may be a transaction message formatted pursuant to one or more standards and including a plurality of data elements. The data elements may include a data element configured to store a personal account number, and a data element configured to store a geographic location.

In step 306, the processing unit 204 of the processing server 104 may determine if the geographic location is valid. To make the determination, the processing unit 204 may identify an account profile 210 that includes an account identifier corresponding to the personal account number stored in the received transaction request, and determine if the geographic location is included in a geographic area associated with a profile rule included in the identified account profile 210. If the location is invalid (e.g., the transaction's location is not included in a geographic area associated with a profile rule), then, in step 308, the transmitting unit 206 may transmit an invalid location determination. The determination may be transmitted to an issuer 106 associated with the transaction account related to the identified account profile 210, and may, in some instances, be included in or accompanied by the received authorization request.

If, in step 306, the processing unit 204 determines that the location of the transaction is valid (e.g., the transaction is in a geographic area associated with a profile rule in the identified account profile 210), then, in step 310, the processing unit 204 may determine if the transaction complies with any other account controls that may be associated with the account profile 210 or related transaction account. Account controls may include limits set by the cardholder(s)

(e.g., transaction limits, merchant limits, etc.), limits set by the issuer 106 (e.g., merchant types, industry types, location limits, etc.), additional fraud controls, risk assessment values, etc. If the other controls are not satisfied, such as, for example, if the transaction is determined fraudulent due to other considerations, then, in step 312, an invalid transaction determination may be transmitted by the transmitting unit 206.

If, in step 310, the processing unit 204 determines that any other controls to which the account profile 210 and/or payment transaction is subject are satisfied, then, in step 314, the transmitting unit 206 may transmit a valid transaction notification. The valid transaction notification may be transmitted to the issuer 106, an acquirer, a merchant 116, the payment network 102, or other suitable entity. The notification may be transmitted as included in or accompanied by the authorization request, such as in a modified authorization request, and may be transmitted using the payment rails and its associated protocols or other suitable method.

Figure 4:
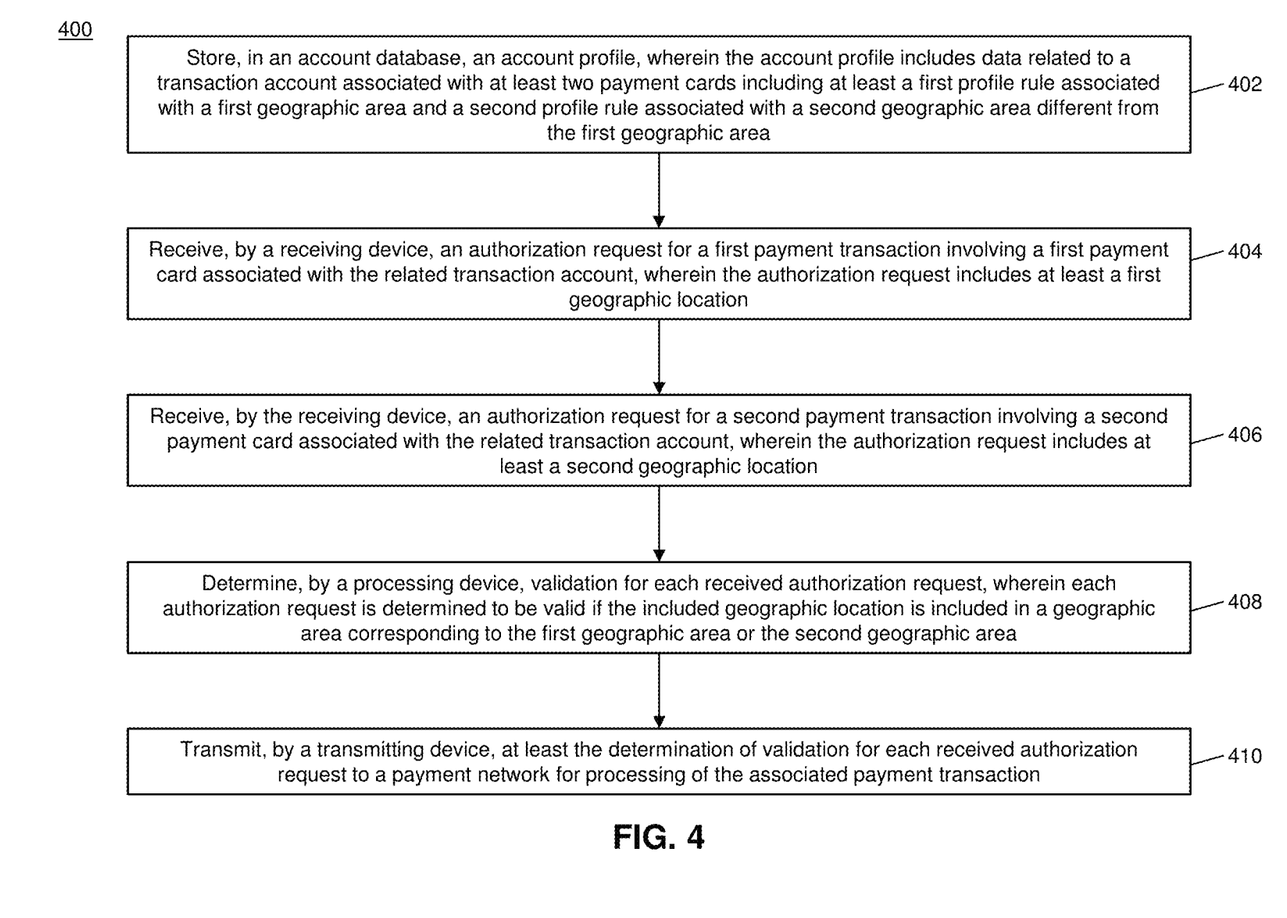
FIG. 4 is a flow chart illustrating an exemplary method for fraud control of a transaction account based on geolocation in accordance with exemplary embodiments.

Exemplary Method for Fraud Control of a Transaction Account Based on Geolocation FIG. 4 illustrates a method 400 for the fraud control of a transaction account based on geolocation using profile rules associated with the transaction account.

In step 402, an account profile (e.g., the account profile 210) may be stored in an account database (e.g., the account database 208), wherein the account profile 210 includes data related to a transaction account associated with at least two payment cards (e.g., the first payment card 112 and the second payment card 114) including at least a first profile rule associated with a first geographic area (e.g., the first geographic area 118) and a second profile rule associated with a second geographic area (e.g., the second geographic area 120) different from the first geographic area 118. In step 404, an authorization request for a first payment transaction involving a first payment card 112 associated with the related transaction account may be received by a receiving device (e.g., the receiving unit 202), wherein the authorization request includes at least a first geographic location.

In step 406, the receiving device 202 may receive an authorization request for a second payment transaction involving a second payment card 114 associated with the related transaction account, wherein the authorization request includes at least a second geographic location. In step 408, a validation for each received authorization request may be determined by a processing device (e.g., the processing unit 204), wherein each authorization request is determined to be valid if the included geographic location is included in a geographic area corresponding to the first geographic area 118 or the second geographic area 120. In step 410, at least the determination of validation for each received authorization request may be transmitted by a transmitting device (e.g., the transmitting unit 206) to a payment network for processing of the associated payment transaction. In some instances, the payment network may forward the authorization request to a financial institution (e.g., the issuer 106) associated with the related transaction account.

In one embodiment, the method 400 may further include: receiving, by the receiving device 202, a traveling notification, wherein the traveling notification indicates the first payment card 112 or the second payment card 114 being located at a geographic location in a third geographic area different from the first geographic area 118 and the second geographic area 120; and updating, by the processing device 204, the first profile rule or the second profile rule included in the account profile 210 to be associated with the third geographic area. In a further embodiment, the first profile rule or the second profile rule may be updated prior to receiving the authorization request for the first payment transaction or second payment transaction. In another further embodiment, the account profile 210 may be associated with a mobile communication device, and the traveling notification may indicate identification of a geographic location of the associated mobile communication device at the geographic location in the third geographic area. In yet another further embodiment, the account profile 210 may be associated with an identity document, and the traveling notification may indicate identification of the identity document at the geographic location in the third geographic area.

In some embodiments, the method 400 may also include identifying, by the processing device 204, the first geographic area 118 associated with the first profile rule based on geographic locations included in a plurality of payment transactions involving the related transaction account t. In one embodiment, the account profile 210 may further include a plurality of transaction data entries, each transaction data entry including data related to a payment transaction involving the related transaction account and including at least a geographic location. In a further embodiment, the method 400 may further include identifying, by the processing device 204, the first geographic area 118 associated with the first profile rule based on the geographic location included in one or more transaction data entries stored in the account profile 210.

In some embodiments, the first profile rule may be associated with the first payment card 112 and the second profile rule may be associated with the second payment card 114. In a further embodiment, each payment transaction may be determined to be valid by the processing device 204 if the included geographic location is included in a geographic location associated with the geographic area associated with the involved payment card.

Computer System Architecture

Figure 5:
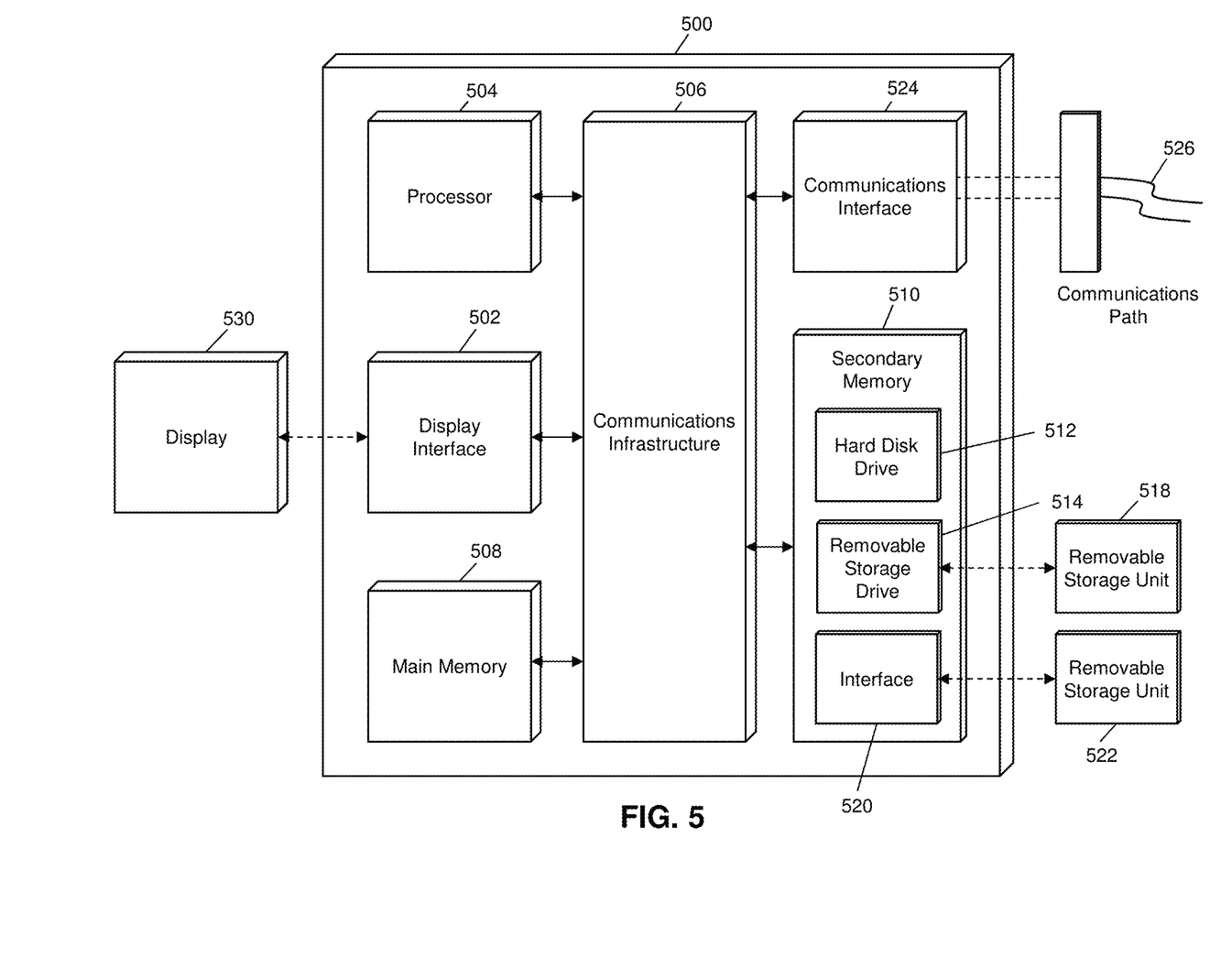
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 104 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

Techniques consistent with the present disclosure provide, among other features, systems and methods for fraud control of a transaction account based on geolocation. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for fraud control of a transaction account based on geolocation, comprising configuring a hardware processing server to perform:

storing, by a processing device of the processing server in an account database, a data structure containing data that corresponds to a financial transaction account that is accessible via at least two payment cards tied to the financial transaction account, wherein the data contained in the data structure comprises at least (i) a first data defining a first geographic area, (ii) a second data defining a second geographic area different from the first geographic area, and (iii) at least one mobile device identifier associated with at least one of the two payment cards, wherein the processing server is positioned in the communication path between merchants and issuers;

receiving, by a receiving device of the processing server and from a first merchant point of sale device, an authorization request message formatted according to an interchange standard for a first payment transaction initiated via use of a first payment card of the at least two payment cards tied to the financial transaction account, wherein the authorization request message for the first payment transaction includes at least a first geographic location;

receiving, by the receiving device of the processing server and from a second merchant point of sale device, an authorization request message formatted according to an interchange standard for a second payment transaction initiated via use of a second payment card of the at least two payment cards tied to the financial transaction account, wherein the authorization request message for the second payment transaction includes at least a second geographic location;

determining, by the processing device of the processing server, validation for both the authorization request message for the first payment transaction initiated with the first payment card and the authorization request message for the second payment transaction initiated with the second payment card, wherein each authorization request is determined to be valid in response to the first and second geographic locations included in the authorization request messages for the first and second payment transactions, respectively, are included in a geographic area corresponding to the first geographic area or to the second geographic area;

modify, by the processing device of the processing server, the authorization request message for the first payment transaction and the authorization request message for the second payment transaction to include a validation determination by adding the validation determination into a data element of the authorization request;

transmitting, by a transmitting device of the processing server, a modified authorization request message indicating the determination of validation for each received authorization request to an issuer entity of the financial transaction account in a payment network for processing of the respective corresponding payment transaction;

identifying, by the processing device of the processing server, movement of a mobile device associated with at least one of the two payment cards to a new geographic area, wherein said new geographic area is a third geographic area different from the first and second geographic areas; and in response to identifying the movement of the mobile device from one of the first geographic area or second geographic area to the new geographic area, automatically updating, by the processing device of the processing server, without requiring participation by account holders associated with the transaction account, one of the first data and the second data of the data structure, stored in the account database, to be associated with the third geographic area rather than a previous location associated with one of the first geographic area or the second geographic area.

2. The method of claim 1, wherein the first data or the second data is updated prior to receiving the authorization request message for the first payment transaction or the authorization request message for the second payment transaction.

3. The method of claim 1, wherein
the stored data further defines an identity document, and
the processing server is further configured to receive a notification indicating that the identity document is in a geographic location different from the first geographic area and the second geographic area.

4. The method of claim 1, further comprising:
identifying, by the processing device, the first geographic area based on geographic locations included in a plurality of payment transactions funded by the financial transaction account.

5. The method of claim 1, wherein the stored data structure further includes data defining a plurality of transaction data entries, each transaction data entry including data describing a payment transaction funded by the financial transaction account and including at least a geographic location.

6. The method of claim 5, further comprising:
identifying, by the processing device, the first geographic area based on one or more of the geographic locations respectively included in one or more of the plurality of transaction data entries.

7. The method of claim 1, wherein the first data identifies the first payment card and wherein the second data identifies the second payment card.

8. The method of claim 7, wherein each payment transaction is determined to be valid by the processing device if the respective geographic location for each payment transaction is included in the geographic area corresponding to the payment card that respectively initiates each payment transaction.

9. A hardware processing server configured to perform fraud control of a financial transaction account based on geolocation, comprising a processing device, an account database, a receiving device, and a transmitting device, wherein:

the processing device, of the hardware processing server, is configured to store in the account database a data structure containing data that corresponds to a financial transaction account that is accessible via at least two payment cards tied to the financial transaction account, wherein the data contained in the data structure comprises at least (i) a first data defining a first geographic area, (ii) a second data defining a second geographic area different from the first geographic area, and (iii) at least one mobile device identifier of at least one mobile communication device associated with at least one of the two payment cards, wherein the hardware processing server is positioned in the communication path between merchants and issuers;

the receiving device, of the hardware processing server, is configured to receive
from a first merchant point of sale device, an authorization request message formatted according to an interchange standard for a first payment transaction initiated via use of a first payment card of the at least two payment cards tied to the financial transaction account, wherein the authorization request message for the first payment transaction includes at least a first geographic location, and from a second merchant point of sale device, an authorization request message formatted according to an interchange standard for a second payment transaction initiated via use of a second payment card of the at least two payment cards tied to the financial transaction account, wherein the authorization request message for the second payment transaction includes at least a second geographic location;

the processing device, of the hardware processing server, is further configured to determine validation for both the authorization request message for the first payment transaction initiated with the first payment card and the authorization request message for the second payment transaction initiated with the second payment card, wherein each authorization request is determined to be valid in response to the first and second geographic locations included in the authorization requests for the first and second payment transactions, respectively, are included in a geographic area corresponding to the first geographic area or to the second geographic area; and modify the authorization request message for the first payment transaction and the authorization request message for the second payment transaction to include a validation determination by adding the validation determination into a data element of the authorization request;

the transmitting device, of the hardware processing server, is configured to transmit a modified authorization request message that indicates the determination of validation for each received authorization request to an issuer entity of the financial transaction account in a payment network for processing of the respective corresponding payment transaction;

the processing device is further configured to identify movement of a mobile device associated with at least one of the two payment cards to a new geographic area, wherein said new geographic area is a third geographic area different from the first and second geographic areas; and automatically update, without requiring participation by account holders associated with the transaction account, in response to identifying the movement of the mobile device from one of the first geographic area or second geographic area to the new geographic area, one of the first data and the second data of the data structure, stored in the account database, to be associated with the third geographic area rather than a previous location associated with one of the first geographic area or the second geographic area.

10. The hardware processing server of claim 9, wherein the first data or the second data is updated prior to receiving the authorization request message for the first payment transaction or the authorization request message for the second payment transaction.

11. The hardware processing server of claim 9, wherein the stored data further defines an identity document, and the notification indicates that the identity document is in a geographic location different from the first geographic area and the second geographic area.

12. The hardware processing server of claim 9, wherein the processing device is further configured to identify the first geographic area based on geographic locations included in a plurality of payment transactions funded by the financial transaction account.

13. The hardware processing server of claim 9, wherein the stored data structure further includes data defining a plurality of transaction data entries, each transaction data entry including data describing a payment transaction funded by the financial transaction account and including at least a geographic location.

14. The hardware processing server of claim 13, wherein the processing device is further configured to identify the first geographic area based on one or more of the geographic locations respectively included in one or more of the plurality of transaction data entries.

15. The hardware processing server of claim 9, wherein the first data identifies the first payment card and wherein the second data identifies the second payment card.

16. The hardware processing server of claim 15, wherein each payment transaction is determined to be valid by the processing device if the respective geographic location for each payment transaction is included in the geographic area corresponding to the payment card that respectively initiates each payment transaction.

* * * * *